United States Patent Office 3,180,750
Patented Apr. 27, 1965

3,180,750
WATER REPELLENT COMPOSITIONS AND PRODUCTS AND PROCESS OF PREPARING THE SAME
Fred B. Shippee and Domenick D. Gagliardi, East Greenwich, and William J. Jutras, Jr., Peace Dale, R.I., assignors, by mesne assignments, to GRC and Argus Chemical Corporation, a corporation of New York
No Drawing. Filed July 5, 1960, Ser. No. 40,533
22 Claims. (Cl. 106—270)

This invention relates to a process for rendering fibrous and particularly textile materials water-repellent and to water-repellent compositions for use in this process, and to the water-repellent materials obtained thereby. More particularly, this invention relates to a process of rendering such materials water-repellent by application thereto of a fatty ketone and a polymeric wax.

Considerable work has been done in recent years in rendering textile materials water-repellent, and a variety of materials have been made available for this purpose. One of the principal requirements of a water-repellent finish in addition to the water-repellency is that it be resistant to removal by washing and dry cleaning. Such water-repellent finishes are hard to obtain, however, and most finishes in use today if resistant at all are capable of withstanding only one or the other of the two cleaning processes used, that is, solvent dry cleaning or aqueous laundering, but not both. Water-repellent textiles are accordingly carefully marked whether they should be cleaned by laundering or by dry cleaning, so that the necessary precautions can be taken in use.

Most waxes, for example, are capable of imparting only a temporary water-repellent finish in textiles. Waxes are easily applied to textiles from hydrocarbon solutions or aqueous emulsions. However, the waxes in use do not provide a durable finish, but are quite easily removed either by dry cleaning or by laundering.

In accordance with the instant invention, a process is provided for making fibrous materials durably water-repellent by application thereto of a mixture of a fatty ketone and a polymeric wax. Neither of these components alone is capable of imparting water-repellency even of a temporary nature, but when applied together, a very fine and durable water-repellent finish is obtained which does not affect other desirable properties of the material. The water-repellent compositions of the invention according comprise these two components as the essential ingredients.

The compositions of the invention can be applied from any available form of liquid application medium, such as from aqueous emulsions of the water-in-oil or oil-in-water type, or from solutions in organic solvents for the components of the composition. The components can be formulated as simple mixtures in such application media. A blend which is preferred for use in emulsions because each emulsified particle contains the desired proportions of polymeric wax and fatty ketone can be prepared by melting together the ingredients, that is, the fatty ketone and the polymeric wax, at a temperature above the melting point of at least one of these ingredients, and then dispersing or dissolving the resulting material in the application medium. Such hot melts can be formed into emulsions by simple mixing with water, desirably with the addition of emulsifying agents where stability of the emulsion is a factor, or by pouring the melt into water with rapid stirring. They are also soluble in many organic solvents, such as ketones, aliphatic esters, and chlorinated hydrocarbons, and can be applied therefrom to fibrous materials not attacked or dissolved thereby.

The process and water-repellent compositions of the invention are applicable to fibrous and particularly textile materials of all types, made from natural and synthetic fibers and blends thereof, such as naturally-occurring fibers, for example, wool, cotton, silk, ramie, jute, cellulose, wood, leather, paper, hemp, sisal, linen and maguey fibers, and synthetic fibers such as viscose rayon, acetate rayon, nylon, polyacrylonitrile, polyvinylidene chloride, copolymers of vinyl chloride and acrylonitrile, polyvinyl acohol, polyesters of terephthalic acid and ethylene glycol and other glycols, protein-based fibers such as those derived from zein, peanut protein, casein and alginates, mineral wool, and fibrous glass. The fibers may be in the form of monofilaments, linters, nonwoven bats, roving, sliver, yarn, felts, warps, sheets, and woven and nonwoven and knitted materials of all sorts.

The polymeric wax should have a molecular weight of at least about 750, and should contain free carboxylic acid groups. Oxidized waxes contain such groups. The upper limit is not critical, and depends solely on emulsifiability or solubility in the application medium, which are additional prerequisites. Lower molecular weight waxes such as paraffin, stearic acid, behenic acid and dimeric fatty acids are quite unsatisfactory, whether oxidized or unoxidized, and do not give durable water-repellent finishes, even in combination with the fatty ketone. Typical oxidized polymeric waxes which are effective in the invention are Fischer-Tropsch wax (an oxidized Fischer-Tropsch hydrocarbon wax mixture having an acid number of 5 to 40), oxidized microcrystalline wax, and oxidized polyolefins of the emulsifiable type, both of low and high viscosities, and low and high densities, such as oxidized polyethylene, oxidized polypropylene, and oxidized polybutene.

The oxidized waxes are definitely not equivalent to the nonoxidized waxes. The former are particularly advantageous in the invention, and are distinguished by their ability to impart water-repellent finishes of a high order of durability. Free acid groups, which distinguish the oxidized waxes from the nonoxidized ones, may be responsible for the difference between the two, particularly when a resin-forming component is included in the composition.

The acid number of the oxidized waxes is not critical, and can range from about 2 to about 50. If acidity of the finish is a problem because of the particular fibrous materials present in the base, an alkaline material can be incorporated in the composition in sufficient amount to reduce the acidity to within acceptable limits.

The other essential ingredient of the water-repellent compositions of the invention is a fatty ketone. This class of material is defined by the formula RCOR', where R and R' are organic radicals having from one to about thirty carbon atoms. At least one of the Rs is a long chain aliphatic group including an alkyl group of at least twelve carbon atoms, and the other R can be the same or an alkyl, alkenyl, aryl, cycloalkyl, or mixed alkyl aryl radical. The number of carbon atoms in the ketone total at least eighteen up to about sixty.

R and R' can, for example, be methyl, ethyl, propyl, isopropyl, n-butyl, t-butyl, isoamyl, isohexyl, n-hexyl, n-heptyl, 2-ethyl hexyl, isooctyl, t-nonyl, decyl, dodecyl, tetradecyl, hexadecyl, octadecyl, oleyl, linoleyl, ricinoleyl, allyl, decenyl, propynyl, butadienyl, hexynyl, and behenyl.

Typical symmetrical and asymmetrical fatty ketones within this class are laurone, behenone, methyl heptadecyl ketone, hexadecyloctadecyl ketone, dioctadecyl ketone, palmitone, myristyl stearyl ketone, oleyl stearyl ketone, lauryl stearyl ketone, $(C_{18}H_{37}NHCH_2CH_2)_2CO$, decylhexadecyl ketone, octyloctadecyl ketone, and butylhexadecyl ketone. Stearone is a commercially available fatty ketone derived from a mixture of naturally-occurring fatty acids, 75% stearic, 22% palmitic and 3% oleic acids, and is preferred in many cases, because it is not only more effective than many other fatty ketones, but is also less expensive. All such ketones are referred to herein as fatty ketones, because of the presence of the long chain aliphatic group of at least twelve carbon atoms.

Both the polymeric wax and the fatty ketone should, of course, be a solid material at the temperatures of use of the base material. The higher the melting point, the better, and the harder the material at normal atmospheric temperatures, the better. In general, it is preferred that the polymeric wax have a melting point of at least about 60° C., up to about 150° C. The melting point of the fatty ketone is not critical. There is no critical upper limit of melting point, since the wax is applied not as a hot melt but from solution or dispersion.

The proportions of polymeric wax to fatty ketone in the water-repellent compositions of the invention are not critical, but should be approximately equal for optimum results. Thus, the preferred range of proportions is from 30 to 70% polymeric wax and from 70 to 30% fatty ketone. However, there can be employed from 12.5 to 87.5% polymeric wax and from 87.5 to 12.5% fatty ketone with satisfactory results.

These ingredients can if desired be hot-melt blended or mixed to form a water-repellent solution concentrate, sold as such ready for mixing with water and other optional ingredients, such as emulsifiers, by the finishing company which is to apply the water-repellent finish. A very concentrated stable water-in-oil or oil-in-water emulsion can also be formulated which is dilutable by any of the dispersing media to the desired applying concentration at the mill. Such compositions can also be sold to dry cleaning and laundry establishments to replace nondurable finishes removed in the cleaning.

It is apparent from the above that the concentration of these essential ingredients in the liquid application media is not critical. A solution or dispersion too concentrated for application can readily be diluted by addition of more of the dispersing medium or solvent. In general, the solutions or dispersions applied to the fibrous materials have a concentration of active water-repellent ingredients ranging from 1 to 30%.

As indicated above, when the oxidized polymeric wax has an unduly high acid number, an alkaline material can be included. Suitable alkaline materials include alkali metal hydroxides such as sodium hydroxide and potassium hydroxide, and aliphatic amines such as butyl amine, strongly basic alkanol amines such as diethanolamine, monoethanolamine and triethanolamine, and alkaline inorganic salts such as borax, disodium phosphate and sodium carbonate. Usually, the amount of alkaline material is sufficient to reduce the acidity to the desired level.

When water-in-oil or oil-in-water emulsions are to be formed of the water-repellent ingredients, an emulsifying agent should be included. Emulsifying agents are well known to this art, and any emulsifying agents ordinarily incorporated in fibrous finishing compositions can be employed. The nonionic emulsifying agents are a preferred class because they do not impart an acidity or basicity which must be controlled by addition of alkaline or acidic buffers.

One class of emulsifiers are the phenoxy polyoxyethylene alcohols, such as alkyl oxyethers and esters and thioethers and esters, having the following general formula:

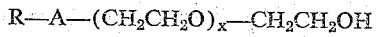

where R is a straight or branched chain saturated or unsaturated hydrocarbon group having from eight to eighteen carbon atoms or an aralkyl group having a straight or branched chain saturated or unsaturated hydrocarbon group of from eight to eighteen carbon atoms attached to the aryl nucleus, and attached to A through the aryl nucleus. A is selected from the group consisting of ethereal oxygen and sulfur, carboxylic ester and thiocarboxylic ester groups, and $x$ is a number from 8 to 20. R can, for example, be a straight or branched chain octyl, nonyl, decyl, lauryl, myristyl, cetyl or stearyl group, or an alkylaryl group such as octylphenyl, nonylphenyl, decylphenyl, stearylphenyl, etc.

When R is alkyl is will be evident that the emulsifier can be regarded as derived from an alcohol, mercaptan, oxy or thio fatty acid of high molecular weight, by condensation with ethylene oxide. Typical of this class of alkyl ether are the condensation products of oleyl or dodecyl alcohol or mercaptan with from 8 to 17 moles of ethylene oxide, such as "Emulphor ON," "Nonic 218" and "Sterox SE" and "SK." Typical alkyl esters are "G1226," "Renex" (polyoxyethylene esters of tall oil acids), "Sterox CD" and "Neutronyx 330" and "331" (higher fatty acid esters of polyethylene glycol).

When R is aralkyl, the emulsifier can be derived from an alkyl phenol or thiophenol.

The ethoxylated alkyl phenols and thiophenols have the following general formula:

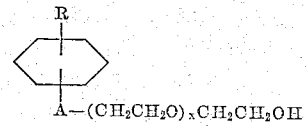

where R is a straight or branched chain saturated or unsaturated hydrocarbon group having at least eight carbon atoms up to approximately eighteen carbon atoms, A is oxygen or sulfur and $x$ is a number from 8 to 20. R can, for example, be a straight or branched chain octyl, nonyl, decyl, lauryl, cetyl, myristyl or stearyl group. Typical are the condensation products of octyl and nonyl phenol and thiophenol with from 8 to 17 moles of ethylene oxide, available commercially under the trade names "NIW," "Antarox A-400," "Igepal CA" and "CO," "Triton X-100," "Neutronyx 600," and "Tergitol NFX."

Other classes of emulsifiers are the Pluronics, polyoxypropylene polyoxyethylene condensates, such as Pluronic L-44, described in U.S. Patents Nos. 2,674,619 and 2,677,700.

The aliphatic fatty acid partial esters of hexitols such as sorbitol and mannitol and their anhydrides are a particularly desirable class of emulsifiers. Typical are sorbitan monooleate, sorbitan monostearate, and sorbitan monopalmitate.

The polyoxyalkylene glycol ethers of such esters also are useful. These have one or more of the free hydroxyls etherified with an average of one to twenty oxyalkylene glycol units, such as sorbitan monooleate polyoxyethylene glycol and sorbitan monopalmitate polyoxyethylene glycol.

Diethanolamine-fatty acid condenstes can be used, such as Alrosol. Also useful are the partial glycerol esters of fatty acids such as stearic acid, palmitic acid and myristic acid and the alkali metal and amine or ammonia salts of such acids, of petroleum sulfonates, of alkyl aryl sulfonates such as sodium dodecyl benzene sulfonate, and sodium keryl benzene sulfonate, and of long chain alkyl sulfates such as sodium lauryl sulfate and sodium oleyl sulfate.

The amount of emulsifying agent will depend upon that required to produce a stable dispersion or solution of the water-repellent composition in the suspending medium. The amount is in no way critical, and is readily determined. Usually, the amount will be within the range from about 0.1 to about 50% by weight of the polymeric wax and ketone in the water-repellent composition.

The mixtures of polymeric wax and fatty ketone are best cured in situ on the fibrous materials at a pH on the acid side, that is, below 7. However, the application medium can have an acid or alkaline pH, the latter being formulated to become acid in situ, by, for example, employing a latent acid catalyst.

The durability of the water-repellent finish of the invention can be improved and in addition in some cases coupled with a degree of crease-proofing by including in these compositions a cross-linking agent, which aids in bonding the polymeric wax and fatty ketone to the fibrous base. By the term "cross-linking agent" is meant any polyfunctional chemical compound capable of resin-forming polymerization and of reaction with ketones, carboxylic acids, and active hydrogen groups in the fibrous substrate. Effective cross-linking agents are aldehydes and materials which liberate or contain aldehydes. Typical aldehydes are formaldehyde, paraformaldehyde, dialdehyde starch, dialdehyde cellulose, hexamethylene tetramine, acrolein, glycidaldehyde, methacrolein, glyoxal, hexanedial-1,3, and propanedial-1,3, and their acetals.

Also useful cross-linking agents are the epoxy resin-forming materials such as the polyglycidyl ethers of polyols, for example, diglycidyl ether of butanediol, triglycidyl ether of glycerol, tetraglycidyl ether of pentaerythritol, diglycidyl ether of Bisphenal A, diglycidyl ether of diphenolic acids such as $\gamma,\gamma$-bis(p-hydroxyphenyl) valeric acid, vinyl cyclohexene dioxide, epoxidized rubbers, glycidyl methacrylate and its polymers and copolymers; also, tris-(aziridinyl) phosphine oxide, and tetra-(hydroxymethyl) phosphonium chloride.

Aldehyde-containing materials useful as cross-linking agents include aldehyde-amine resins in the water-dispersible stage of polymerization. Preferred materials of this type are prepared by reacting from 0.5 to 1 mole of aldehyde for each active NH- group on the amine. Specific examples include dimethylol urea, poly(oxymethyl) ureas, e.g., bis-(methoxymethyl) uron (see U.S. Patent 2,370,893); bis-(hydroxymethyl)-ethylene urea; tetra-(hydroxymethyl)- acetylene diurea; tetra-(methoxymethyl)- acetylene diurea; bis - (hydroxymethyl) - ethylene thiourea; bis-(methoxymethyl)-ethylene urea; 1,3-bis-(hydroxymethyl)-5-hydroxyethyl tetrahydrotriazone (see U.S. Patent 2,304,624); hexamethylol melamine; tri-(methoxymethyl)-melamine; polymethylol triazines, such as trimethylol acetoguanamine and tri-(methoxy methyl) benzoguanamine and water-soluble polymers thereof, including crude reaction products of commerce which contain the indicated monomers or polymers thereof.

As examples of commercial materials of this class of materials are the urea-formaldehyde resins, e.g., "Rhonite 313 or 480"; methoxy methyl urea resins, e.g., "Rhonite R-2"; methylated polymethylol melamines, e.g., "Aerotex M-3" and 66 Resloom M-75"; dimethylol ethylene urea resin, e.g., "Rhonite R-1"; bis-(methoxymethyl) uron, e.g., "Prym A"; and tetramethylol acetylene diurea, e.g., "CET."

Another type of water-dispersible thermosetting aldehyde resin which may be used is the phenolic-aldehyde resins. Suitable reactive phenolic resins are those formed by alkaline condensation of formaldehyde and phenol in a ratio of about 1.1 to about 3 moles of formaldehyde per mole of phenol, with the reaction being arrested while the resin is still in the formative stage. Such resins can be formed from substituted phenols such as resorcinol and o-cresol and with other aldehydes and formaldehyde, e.g., acetaldehyde, furfuraldehyde and the like. Specific examples of such phenolic resins are the "Durez" resins, e.g., "Durez 14798." Additional examples of suitable water-dispersible phenolic resins are those disclosed in U.S. Patent 2,457,493.

The amount of cross-linking agent employed will depend upon the effect desired. Very small amounts may considerably improve the durability of the water-repellent finish. Larger amounts in proportion to the water-repellent composition may impart a crease-proofing effect. Excellent results have been obtained employing application media containing from 1 to 200% by weight of the wax and ketone of a cross-linking agent. There is no upper limit on the amount of cross-linking agent, but the water-repellent will of course be present in an amount to impart water repellency, inasmuch as this property is not imparted by the cross-linking agent. The cross-linking agent preferably is present in an equal proportion to the combined weight of the polymeric wax and fatty ketone.

To accelerate the rate of cure and ensure completion of the cure of the cross-linking agent, a curing catalyst can be included. Catalysts for these curing agents are well known, and any such catalysts which are acidic or latently acidic can be used. Acidic and latently acidic salts such as ammonium salts and amine hydrohalide salts are typical. Numerous illustrative salts are employed in the examples. The acidic zirconium salts are preferred.

The compositions composed of the oxidized polymeric wax and fatty ketone can be marketed as such for use in the preparation of application media, which are described in detail later. Such compositions can also be formulated with one or more cross-linking agents in the desired proportion to the wax-ketone mixture for production of the application medium upon dilution with the dispersing liquid. It is convenient in many cases to prepare such compositions in the form of concentrated emulsions or solutions which are readily diluted with water or other solvents at the time of application. Such compositions are referred to herein as concentrates, inasmuch as they are ordinarily applied only after dilution at a considerably lower concentration of the active components.

In addition to these materials, the concentrates and/or application media of the invention may contain standard fibrous material treating adjuncts, including, for example, oil-repellent finishes such as the perfluorocarbon acid Werner complexes, such as those disclosed in U.S. Patent No. 2,662,835, and perfluoroacrylate polymers and copolymers, dyes, and pigments, textile lubricants, mothproofing agents, flame-proofing agents, shrink-proofing agents, brightening agents, sizes, paper-making chemicals such as wet strength resins for paper, mildew-proofing agents, leather treating agents, and softening agents. Materials in these groups are well known to those skilled in the art, and would be employed to obtain the special effect indicated by the function of the agent. Alternatively, such materials can be applied to the fibrous material either before or after application of the water-repellent composition.

The application media in accordance with the invention can be applied to fibrous materials using conventional equipment. Standard impregnating, padding, and like treating apparatus can be employed. Usually, it is convenient to apply the compositions by dipping, padding or immersing. Brushing, spraying, roller coating, electrostatic coating, doctor-blade coating and like procedures can also be employed. The equipment will be set to give the desired weight of composition per unit area or volume of the base material. The wet pickup will, of course, be adjusted to take into account the concentration of solid materials in the application media. The concentration of solids will in turn depend upon the viscosity required for the equipment used, and if necessary, viscosity increasing agents such as water-soluble cellulose ethers may be employed to limit impregnation of the fibrous base by the application medium. Usually, application media containing from 1 to 30% by weight of solid materials are employed, and the wet pickup is controlled to provide up to about 5% solids, on the treated base material.

Following application of the composition, the base material may be dried to remove suspending liquids. If a cross-linking agent is present, the fibrous base should be subjected to a heat treatment, in order to complete conversion of the cross-linking agent into the thermosetting stage of polymerization. The temperature employed will depend upon the heat-sensitivity of the fibrous base and upon the temperature required to effect such polymerization, and inasmuch as the cross-linking agents are well known materials, these conditions are well known in the art. Ordinarily, temperatures within the range from about 100 to about 300° C. are satisfactory. The time required is roughly inversely proportional to the temperature, and will range from about five seconds to about five hours. In any case, the temperatures and heating times are so adjusted as to avoid decomposition or damage either to the finish or to the fibrous base.

The following examples in the opinion of the inventors represent the best embodiments of their invention.

EXAMPLE 1

A hot-melt blend water-repellent formulation was prepared by melting together 10 parts of AC Polyethylene 629 (an oxidized wax-like polymer, molecular weight about 2,000, emulsifiable grade, melting point 213 to 221° F., acid No. 14 to 17), 10 parts stearone (high molecular weight ketone derived from a commercial stearic acid, composition approximately 75% stearic acid, 22% palmitic acid and 3% oleic acid, melting point 80° C., 97% ketone, 1% free fatty acid, 2% hydrocarbon), 5 parts Tergitol NPX (condensation product of nonyl phenol and 10 moles of ethylene oxide) and 1.5 parts of 20% aqueous potassium hydroxide. The ingredients were charged into a heat mixing vessel, heated to 230° F. can then agitated vigorously until homogeneous and clear.

In a separate heated mixing vessel equipped with a propeller type agitator, 73.5 parts water were heated to 200° F. and stirred vigorously. The hot-melt blend prepared as set forth was then slowly added to this, forming an oil-in-water emulsion. After all of the blend had been added, the rate of stirring was reduced, and continued until the emulsion had cooled to room temperature. The resulting emulsion was milky and completely fluid, with a slightly off-white color. The pH of the emulsion was 11.9. The emulsion was stable, showed no sign of separation after standing at room temperature for three days, and could be diluted with cold water without coagulation.

EXAMPLE 2

(a) 20 parts of this emulsion were mixed with 10 parts of a 50% aqueous solution of dimethylol ethylene urea. This composition is suitable for marketing as a water-repellent concentrate. Textile padding baths are prepared therefrom by dilution with water and addition of curing catalyst.

A textile padding bath was prepared by mixing 30 parts of this emulsion into a solution of 1.25 parts of zinc nitrate $Zn(NO_3)_2 \cdot 6H_2O$ in 68.75 parts of water. Pieces of dyed cotton poplin and 80 x 80 cotton sheeting were padded with this bath, nip rolled to give a wet pickup of about 75%, framed and air-dried for five minutes at 250° F. and cured in an oven for five minutes at 320° F. The resulting fabrics had substantially the same color, hand, porosity and appearance as the untreated fabrics.

(b) 10 parts of the emulsion of Example 1 was mixed with 5 parts of an 80% aqueous solution of methylated methylol melamine. This composition is suitable for marketing as a water-repellent concentrate. Textile padding baths are prepared therefrom by dilution with water and addition of curing catalyst.

A second textile padding bath was prepared by mixing 15 parts of this emulsion into a solution of 1.6 parts of magnesium chloride $MgCl_2 \cdot 6H_2O$ in 84.4 parts of water. Cotton poplin and 80 x 80 cotton sheeting were padded and treated as above. The resulting fabrics had substantially the same color, hand, porosity, and appearance of the untreated fabrics.

EXAMPLE 3

An oil-in-water emulsion was prepared by the procedure of Example 1, substituting 15 parts of the oxidized polyethylene and 5 parts of stearone. The emulsion obtained had a pH of 10.1, and was stable.

A textile padding bath was prepared from this emulsion by mixing 10 parts of the emulsion with 5 parts of an 80% aqueous solution of methylated methylol melamine, 1.86 parts of magnesium chloride $MgCl_2 \cdot 6H_2O$ and 84.4 parts of water. Cotton poplin and 80 x 80 cotton sheeting were padded and cured as described in Example 2 with this emulsion.

The resulting fabrics had substantially the same color, hand, porosity and appearance of the untreated fabrics.

EXAMPLE 4

An oil-in-water emulsion was prepared by the procedure of Example 1, substituting 5 parts of the oxidized polyethylene and 15 parts of stearone. The emulsion obtained had a pH of 12.1, and was stable.

A textile padding bath was prepared from this emulsion by mixing 10 parts of the emulsion and 5 parts of an 80% aqueous solution of methylated methylol melamine, 1.86 parts of magnesium chloride $MgCl_2 \cdot 6H_2O$ and 84.4 parts of water. Cotton poplin and 80 x 80 cotton sheeting were padded and cured as described in Example 2 with this emulsion.

The resulting fabrics had substantially the same color, hand, porosity and appearance of the untreated fabrics.

The fabrics obtained from Examples 2 to 4 were tested for water-repellency and durability of the water-repellent finish by A.A.T.C.C. Standard Test Method 22–1952. Thereafter, the fabrics were laundered using full wash and rinse cycles in an automatic home washer type machine with 10 g. of "Ivory" flakes and 25 g. of washing soda, followed by drying for five minutes at 250° F. The results of the water-repellency tests conducted on the original and laundered treated fabrics in terms of spray ratings are given in the following table:

*Table I*

| Example No. | Cross-linking agent | Unlaundered | | Laundered | |
|---|---|---|---|---|---|
| | | Poplin | Sheeting | Poplin | Sheeting |
| 2a | Dimethylol ethylene urea | 100 | 100 | 70 | 80 |
| 2b | Methylated methylol melamine | 100 | 100 | 90 | 100 |
| 3 | ----do---- | 100 | 100 | 80 | 90 |
| 4 | ----do---- | 100 | 100 | 90 | 100 |

*Table II*

| Example No. | Percent emulsion | Percent catalyst | Cross-linking agent | Bath pH | Bath stability Initial | Bath stability After 4 hours |
|---|---|---|---|---|---|---|
| 5 | 10 | 0.5 ZrOCl₂·8H₂O | 5% methylated methylol melamine [1] | 4.6 | Excellent | Excellent. |
| 6 | 10 | 0.5 ZrOCl₂·8H₂O+0.15% aluminum acetate buffer | ____do____ | 5.1 | ____do____ | Do. |
| 7 | 10 | 0.5 ZrOCl₂·8H₂O | 5% dimethylol ethylene urea [2] | 2.6 | ____do____ | Do. |
| 8 | 10 | 0.5 ZrOCl₂·8H₂O+0.15% aluminum acetate buffer | ____do____ | 5.0 | Unstable | Unstable. |
| 9 | 10 | 0.5 ZrOCl₂·8H₂O | 5% methoxy methyl urea resin [3] | 2.4 | Excellent | Excellent. |
| 10 | 10 | 0.5 ZrOCl₂·8H₂O+0.15% aluminum acetate buffer | ____do____ | 4.7 | ____do____ | Do. |
| 11 | 10 | 0.5 ZrOCl₂·8H₂O | 5% methoxy methyl urea resin | 2.5 | ____do____ | Do. |
| 12 | 10 | 0.5 ZrOCl₂·8H₂O+0.15% aluminum acetate buffer | ____do____ | 4.9 | Unstable | Unstable. |

[1] 75% aqueous solution.  [2] 50% aqueous solution.  [3] 80% aqueous solution of methoxy methyl urea resin, "Prym N".

It is evident from the above data that the water-repellent finish imparted by these emulsions has excellent durability. A rating of 0 after laundering and dry cleaning in this test is typical for conventional wax-type water-repellent finishes.

EXAMPLES 5 TO 12

A series of water-repellent emulsion concentrates was prepared by mixing together at room temperature the proportion of the water-repellent emulsion of Example 1 and cross-linking agent shown in Table II above. These concentrates are suitable for marketing as a water-repellent concentrate. Textile padding baths are prepared therefrom by dilution with water and addition of curing catalyst.

Padding baths were prepared from these concentrates by adding them to solutions of the curing catalysts in water. The composition of these padding baths, pH and relative stability are given in the table.

A group of five different fabrics was padded with each of these padding baths, with a pad set to give a wet pickup as described in Table III, after which the fabric was framed, air-dried for five minutes at 250° F. and then cured for ten minutes at 300° F.

*Table III*

| Fabric used | Pad set | Wet pickup, percent |
|---|---|---|
| Cotton 80 x 80 sheeting | 4 | 74 |
| Cotton vat dyed sateen | 3-4 | 62-64 |
| Viscose challis | 4 | 85 |
| Wool flannel | 3 | 70 |
| Nylon taffeta | 2 | 45 |

Water-repellency of the treated fabrics was determined by spray ratings, using A.A.T.C.C. Standard Test Method 22–1952. The fabrics were then laundered to five full cycles in a "Bendix" automatic home washer, using 10 g. of Ivory flakes and 25 g. of washing soda, followed by frame drying for five minutes at 250° F. for each wash cycle.

The results of these tests are reported in the following table, using the same designation for the treating bath as employed in Table II:

*Table IV*

| Example No. | Cotton Sheeting No. of launderings | | | Cotton Sateen No. of launderings | | | Cotton Challis No. of launderings | | | Wool Flannel No. of launderings | | | Nylon Taffeta No. of launderings | | |
|---|---|---|---|---|---|---|---|---|---|---|---|---|---|---|---|
| | Initial | 1 | 5 | Initial | 1 | 5 | Initial | 1 | 5 | Initial | 1 | 5 | Initial | 1 | 5 |
| 5 | 100 | 100 | 100 | 100 | 100 | 100 | 100 | 100 | ____ | 100 | 100 | 100 | 100 | 100 | 100 |
| 6 | 100 | 100 | 90 | 100 | 100 | 100 | 70 | 100 | 90 | 100 | 100 | 100 | 100 | 100 | 100 |
| 7 | 100 | 100 | 100 | 100 | 100 | 100 | ____ | 80 | 100 | 100 | 100 | 100 | 50 | 100 | 100 |
| 8 | 100 | 100 | 90 | 100 | 100 | 70 | 70 | 90 | 70 | 80 | 100 | 100 | 90 | 100 | 100 |
| 9 | 100 | 100 | 100 | 100 | 100 | 100 | ____ | 100 | 100 | 100 | 100 | 100 | 100 | 100 | 100 |
| 10 | 100 | 100 | 100 | 100 | 90 | 70 | 70 | 100 | 100 | 70 | 100 | 100 | 70 | 100 | 100 |
| 11 | 100 | 100 | 100 | 100 | 90 | 90 | ____ | 90 | 100 | 70 | 100 | 100 | 100 | 100 | 100 |
| 12 | 100 | 100 | 100 | 100 | 100 | 50 | 70 | 90 | 70 | 70 | 100 | 100 | 100 | 100 | 100 |

The durability of these finishes on a variety of textiles to laundering is evident.

EXAMPLES 13 TO 48

A series of padding baths was prepared by mixing together at room temperature the proportion of the water-repellent emulsion of Example 1 shown in Table V below with cross-linking agents, catalysts and water. The composition of these padding baths, pH and relative stability are given in the table.

Table V

| Example No. | Percent emulsion | Percent catalyst | Cross linking agent | Bath pH | Bath stability Initial | Bath stability After 4 hours |
|---|---|---|---|---|---|---|
| 13 | 5 | 1.5 $MgCl_2 \cdot 6H_2O$ | 5% methylated methylol melamine [1] | | Good | |
| 14 | 7.5 | 1.5 $MgCl_2 \cdot 6H_2O$ | ----do---- | | ----do---- | |
| 15 | 10 | 1.5 $MgCl_2 \cdot 6H_2O$ | ----do---- | | ----do---- | |
| 16 | 15 | 1.5 $MgCl_2 \cdot 6H_2O$ | ----do---- | | ----do---- | |
| 17 | 20 | 1.5 $MgCl_2 \cdot 6H_2O$ | ----do---- | | ----do---- | |
| 18 | 30 | 1.5 $MgCl_2 \cdot 6H_2O$ | ----do---- | | Unstable | |
| 19 | 10 | 1.5 $MgCl_2 \cdot 6H_2O$ | 3% methylated methylol melamine [1] | | ----do---- | |
| 20 | 10 | 2.4 $MgCl_2 \cdot 6H_2O$ | 7.5% methylated methylol melamine [1] | | Good | |
| 21 | 10 | 3.2 $MgCl_2 \cdot 6H_2O$ | 10% methylated methylol melamine [1] | | ----do---- | |
| 22 | 10 | 1.5 $MgCl_2 \cdot 6H_2O$ | 5% methylated methylol melamine [1] | 7.0 | ----do---- | |
| 23 | 5 | 0.5 $ZrOCl_2 \cdot 8H_2O$ | ----do---- | | Excellent | Excellent. |
| 24 | 7.5 | 0.5 $ZrOCl_2 \cdot 8H_2O$ | ----do---- | | Unstable | Unstable. |
| 25 | 10 | 0.5 $ZrOCl_2 \cdot 8H_2O$ | ----do---- | 4.2 | ----do---- | Do. |
| 26 | 15 | 0.5 $ZrOCl_2 \cdot 8H_2O$ | ----do---- | | Excellent | Excellent. |
| 27 | 20 | 0.5 $ZrOCl_2 \cdot 8H_2O$ | ----do---- | | ----do---- | Do. |
| 28 | 25 | 0.5 $ZrOCl_2 \cdot 8H_2O$ | None | 1.8 | Good | Good. |
| 29 | 5 | 0.2 $ZrOCl_2 \cdot 8H_2O$ | 5% methylated methylol melamine [1] | 4.3 | ----do---- | Do. |
| 30 | 5 | 0.4 $ZrOCl_2 \cdot 8H_2O$ | ----do---- | 3.9 | ----do---- | Do. |
| 31 | 10 | 0.5 $ZrOCl_2 \cdot 8H_2O$ | 1% methylated methylol melamine [1] | | ----do---- | Do. |
| 32 | 10 | 0.5 $ZrOCl_2 \cdot 8H_2O$ | 2% methylated methylol melamine [1] | | ----do---- | Do. |
| 33 | 10 | 0.5 $ZrOCl_2 \cdot 8H_2T$ | 3% methylated methylol melamine [1] | | ----do---- | Do. |
| 34 | 10 | 0.5 $ZrOCl_2 \cdot 8H_2O$ | 4% methylated methylol melamine [1] | | ----do---- | Do. |
| 35 | 10 | 0.1 $ZrOCl_2 \cdot 8H_2O$ | 5% methylated methylol melamine [1] | | ----do---- | Do. |
| 36 | 10 | 0.2 $ZrOCl_2 \cdot 8H_2O$ | ----do---- | | Unstable | Unstable. |
| 37 | 10 | 0.4 $ZrOCl_2 \cdot 8H_2T$ | ----do---- | | Good | Good. |
| 38 | 5 | 0.5 $ZrOCl_2 \cdot 8H_2O$ | 5% methoxy methyl urea resin [2] | | ----do---- | Do. |
| 39 | 10 | 0.5 $ZrOCl_2 \cdot 8H_2O$ | ----do---- | | ----do---- | Do. |
| 40 | 10 | 0.5 $ZrOCl_2 \cdot 8H_2O$ | 3% methoxy methyl urea resin [2] | | Unstable | Unstable. |
| 41 | 10 | 0.5 $ZrOCl_2 \cdot 8H_2T$ | ----do---- | | Good | Good. |
| 42 | 5 | 0.5 $ZrOCl_2 \cdot 8H_2T$ | 1% glyoxal [1] | | Unstable | Unstable. |
| 43 | 5 | 0.5 $ZrOCl_2 \cdot 8H_2O$ | 5% urea formaldehyde resin [3] | | Good | Good. |
| 44 | 5 | 0.5 $ZrOCl_2 \cdot 8H_2O$ | ----do---- | | ----do---- | Do. |
| 45 | 5 | 0.5 $ZrOCl_2 \cdot 8H_2O$ | 3% formaldehyde [4] | | ----do---- | Do. |
| 46 | 5 | 0.5 $ZrOCl_2 \cdot 8H_2O$ | 5% methylated methylol melamine [1] | | ----do---- | Do. |
| 47 | 6.5 | 0.5 $ZrOCl_2 \cdot 8H_2O$ | 3.3% methylated methylol melamine [1] | | ----do---- | Do. |
| 48 | 5 | 0.5 $ZrOCl_2 \cdot 8H_2O$ | 5% methylated methylol melamine [1] | | ----do---- | Do. |

[1] 75% aqueous solution. [2] 80% aqueous solution of methoxy methyl urea resin, "Pyrm N."
[3] 45% aqueous solution. [4] Aqueous solution solution of 55% formaldehyde and 35% methanol.

Cotton vat-dyed sateen was padded with these padding baths, with a pad set at 3–4 to give a wet pickup of 62–65%, framed, air-dried at 250° F. for five minutes, and then cured for ten minutes at 300° F. Water repellency was determined by spray ratings, as in Examples 5 to 12, after laundering and dry cleaning.

Table VI

| Example No. | Cotton Sateen No. of launderings Initial | Cotton Sateen No. of launderings 5 | Dry cleaning |
|---|---|---|---|
| 13 | 70 | 70 | |
| 14 | 100 | 70 | |
| 15 | 100 | 70 | |
| 16 | 100 | 70 | |
| 17 | 90 | 80 | |
| 18 | 100 | 80 | |
| 19 | 80 | 50 | |
| 20 | 100 | 80 | |
| 21 | 100 | 100 | |
| 22 | 100 | 100 | |
| 23 | 100 | 100 | 80 |
| 24 | 100 | 100 | 70 |
| 25 | 100 | 100 | 80 |
| 26 | 100 | 100 | 70 |
| 27 | 100 | 100 | 70 |
| 28 | 90 | 70 | 70 |
| 29 | 100 | 90 | 80 |
| 30 | 100 | 100 | 80 |
| 31 | 100 | 90 | 70 |
| 32 | 100 | 100 | 70 |
| 33 | 100 | 100 | 70 |
| 34 | 100 | 100 | 70 |
| 35 | 90 | 100 | 70 |
| 36 | 100 | 70 | 70 |
| 37 | 100 | 100 | 80 |
| 38 | 100 | 90 | 70 |
| 39 | 100 | 100 | 80 |
| 40 | 100 | 70 | 70 |
| 41 | 100 | 90 | 70 |
| 42 | 100 | 70 | 80 |
| 43 | 100 | 90 | 70 |
| 44 | 100 | 90 | 70 |
| 45 | 100 | 70 | |
| 46 | 100 | 100 | 80 |
| 47 | 100 | 100 | 70 |
| 48 | 100 | 100 | 70 |

The durability of these finishes to laundering and dry cleaning is evident from the data.

EXAMPLES 49 TO 51

A hot-melt blend was prepared using 20 parts of stearone, 5 parts of emulsifying agent, 1.5 parts of 20% aqueous potassium hydroxide, and 73.5 parts of water, following the procedure of Example 1. A milky, fluid emulsion (Example 49) which was stable was obtained.

A second oil-in-water emulsion (Example 50) was prepared using 20 parts of oxidized polyethylene in place of the stearone, and a third oil-in-water emulsion (Example 51) was prepared using a mixture of 10 parts of oxidized polyethylene and 10 parts of stearone. These emulsions were also fluid, stable, and milky in appearance.

The oxidized polyethylene and stearone were the same materials as used in Example 1.

Padding baths were prepared from these emulsions using dimethylol ethylene urea and zinc nitrate as described in Example 2, and these baths employed to pad cotton poplin and 80 x 80 cotton sheeting, which were dried and cured as set forth in Example 2. When tested according to the A.A.T.C.C. Standard Water Repellency Test 22–1952, the following results were obtained:

Table VII

| Example No. | Water-repellent | Unlaundered Poplin | Unlaundered Sheeting | Laundered Poplin | Laundered Sheeting |
|---|---|---|---|---|---|
| 49 | Stearone alone | 0 | 0 | 0 | 0 |
| 50 | Oxidized polyethylene alone | 0 | 0 | 0 | 0 |
| 51 | Oxidized polyethylene-stearone together | 100 | 100 | 70 | 80 |

The above data show that neither the oxidized polyethylene nor the stearone when used alone from an emulsion system is effective as a water-repellent. The cross-linking agent had no effect on the water-repellency of these ingredients. Thus, the fact that both cooperate to give water-repellency is quite surprising. No explanation can be offered for this phenomenon at the present time.

EXAMPLE 52

A hot-melt blend of oxidized polyethylene (AC-629) 50 parts and laurone 50 parts was prepared by heating these materials to 105° C. and stirring the mix until a homogeneous clear melt was formed, then adding 5 parts of triethanolamine, 12.5 parts of Tergitol NP-27 (condensation product of nonyl phenol with 7 moles of ethylene oxide for each mole of nonyl phenol) and 2.5 parts of Tergitol NP-40 (condensation product of nonyl phenol with 20 moles of ethylene oxide for each mole of nonyl phenol), and the mixtures heated at 105 to 110° C. for fifteen minutes. The melt was poured into 380 parts of water from 95 to 100° C. at high speed agitation, forming an oil-in-water emulsion which was stirred for fifteen minutes at 95° C. and then brought to 30° C. 300 parts of Resloom M-75 (75% aqueous solution of methylated methylol melamine) was added, and the mixture stirred an additional fifteen minutes. A fluid cream-colored emulsion was obtained which showed no tendency to separate.

EXAMPLE 53

A hot-melt blend was prepared exactly as set forth in Example 52, substituting 50 parts of methyl heptadecyl ketone for the laurone. The resulting emulsion was fluid, cream-colored and stable.

EXAMPLE 54

An emulsion was prepared exactly as set forth in Example 52, substituting 50 parts of stearone for the laurone. A fluid, cream-colored emulsion was obtained which was stable.

Ten parts of each of the emulsions of Examples 52, 53 and 54 were diluted with 89.7 parts of water and mixed with 0.3 part of ZrOCl$_2$·8H$_2$O. The padding baths thus obtained were applied to 80 x 80 cotton print cloth at an 80% wet pickup, dried for five minutes at 250° F. and cured for five minutes at 320° F. The water-repellency of each fabric was then determined by the A.A.T.C.C. Spray Test 22–1952. The fabrics were washed using the Bendix washer procedure set forth in Examples 5 to 12. Other samples of the fabrics were dry cleaned, also using the procedure of those examples.

The data obtained was as follows:

*Table VIII*

| Example No. | Water-repellent | Spray ratings | | |
|---|---|---|---|---|
| | | Initial | Washed | Dry cleaned |
| Control | None | 0 | 0 | 0 |
| 52 | Oxidized polyethylene-laurone | 70 | 70 | 50 |
| 53 | Oxidized polyethylene-methyl heptadecyl ketone | 70 | 70 | 50 |
| 54 | Oxidized polyethylene-stearone | 100 | 90 | 90 |

It is apparent from the data that all of the water-repellent finishes obtained are durable. Optimum results are obtained with stearone.

EXAMPLE 55

A series of paddings were carried out on a variety of textiles, using the emulsion of Example 54. Padding baths of 6, 9 and 12% dilutions were applied to these fabrics to an 80% wet pickup. The padded fabrics were dried for five minutes at 250° F., cured for five minutes at 320° F. and then tested for water-repellency, as set forth above. The results of these tests were as follows:

*Table IX*

| Fabric | Percent bath concentration | Spray ratings | | |
|---|---|---|---|---|
| | | Initial | Washed | Dry cleaned |
| Nylon taffeta | 6 | 100 | 80 | 90 |
| | 9 | 100 | 80 | 90 |
| | 12 | 100 | 80 | 90 |
| Acetate suiting | 6 | 100 | 90 | 80 |
| | 9 | 100 | 90 | 90 |
| | 12 | 100 | 90 | 90 |
| Dacron challis | 6 | 90 | 90 | 90 |
| | 9 | 100 | 90 | 80 |
| | 12 | 100 | 90 | 100 |
| Acrilan viscose | 6 | 100 | 80 | 100 |
| | 9 | 100 | 100 | 90 |
| | 12 | 100 | 100 | 100 |
| Cotton khaki | 6 | 100 | 70 | 80 |
| | 9 | 100 | 80 | 80 |
| | 12 | 100 | 90 | 90 |
| Wool flannel | 6 | 70 | 70 | 70 |
| | 9 | 70 | 80 | 70 |
| | 12 | 70 | 80 | 70 |
| Silk taffeta | 6 | 100 | 90 | 100 |
| | 9 | 100 | 90 | 100 |
| | 12 | 100 | 100 | 100 |

It is apparent that all of the water-repellent finishes obtained on these varied fabrics were quite durable, and withstood both laundering and dry cleaning.

EXAMPLES 56 TO 59

50 parts of stearone and 50 parts of oxidized polyethylene (AC-629) were blended together in the molten state, 15 parts of Tergitol NPX, 5 parts of paraformaldehyde and 1 part potassium hydroxide were added, and the mixture heated at 100° C. for ninety minutes, by which time all of the paraformaldehyde had reacted and a clear molten wax obtained. This was poured into metal trays and allowed to cool. Pieces or flakes of this creamy white homogeneous wax formed a milky emulsion with hot water.

Portions of this emulsion were added to four different commercial cotton crease-proofing resin compositions in the amount of 1%, and 0.5% ZnNO$_3$·6H$_2$O added as a curing agent, and these compositions applied to crease-proof cotton textile material. A parallel series of applications were carried out without the emulsion, using only the crease-proofing resin. The compositions were applied by conventional padding, drying at 250° F. for five minutes and curing at 320° F. for five minutes. Thereafter, the water-repellency, crease recovery, and tear strength were determined on the fabrics obtained, with the following results:

*Table X*

| No. | Treating composition | Spray rating | Crease recovery angles | Tear strength, gms. |
|---|---|---|---|---|
| Control | 10% ethylene urea-HCHO resin | 0 | 262 | 788 |
| 56 | Same plus 1% oxidized polyethylene-stearone emulsion | 90 | 273 | 1,096 |
| Control | 10% modified melamine-HCHO resin | 0 | 259 | 846 |
| 57 | Same plus 1% oxidized polyethylene-stearone emulsion | 100 | 274 | 1,008 |
| Control | 10% methylated melamine-HCHO resin | 0 | 258 | 850 |
| 58 | Same plus 1% oxidized polyethylene-stearone emulsion | 80 | 273 | 1,040 |
| Control | 10% methylated urea-HCHO resin | 0 | 260 | 758 |
| 59 | Same plus 1% oxidized polyethylene-stearone emulsion | 90 | 265 | 1,072 |

It is apparent that the water-repellent composition of the invention not only imparts water-repellency to the resin treated fabrics, but also improves tearing resistance and crease recovery. Thus, the composition in addition to being a water-repellent is a durable hydrophobic textile softener. In contrast, an emulsion of oxidized polyethylene sold commercially as a textile softener and used with the above-described crease-proofing resins gave no water-repellency whatsoever.

EXAMPLE 60

A 2% solvent solution of 50 parts oxidized polyethylene (AC-629) and 50 parts stearone was prepared by dissolving these materials in 5000 parts tetrachloroethylene, and this solution employed as a textile padding bath for application to cotton poplin and acetate viscose fabrics. The fabrics were padded in the bath, nip rolled to give a wet pickup of about 75%, framed, and air-dried. The resulting fabrics possessed substantially the same color, hand, porosity and appearance exhibited by the untreated fabrics.

The water-repellency of the fabrics was determined in accordance with the A.A.T.C.C. Standard Test Method 22-1952; the spray rating for the cotton poplin was 100, and for the acetate viscose fabric, 80.

EXAMPLE 61

A series of 2% solutions in tetrachloroethylene was prepared, using varying amounts of oxidized polyethylene (AC-629) and stearone, as indicated in Table XI below, and these solutions employed as textile padding baths for application to cotton poplin and acetate viscose fabrics. The fabrics were padded, nip rolled to give a wet pickup of about 75%, framed and air-dried. The resulting fabrics possessed the color, hand, porosity and appearance of the untreated fabrics. Water-repellency was determined by the A.A.T.C.C. Standard Test Method 22-1952, with the following results:

*Table XI*

| Composition, percent | | Spray rating | |
|---|---|---|---|
| Polyethylene [1] | Stearone | Cotton poplin | Acetate/viscos |
| 100.0 | 0 | 0 | 0 |
| 87.5 | 12.5 | 60 | 50 |
| 75.0 | 25.0 | 70 | 60 |
| 62.5 | 37.5 | 85 | 70 |
| 50.0 | 50.0 | 100 | 80 |
| 37.5 | 62.5 | 100 | 80 |
| 25.0 | 75.0 | 100 | 75 |
| 12.5 | 87.5 | 100 | 70 |
| 0 | 100.0 | 0 | 0 |

[1] AC polyethylene 629.

It is apparent from the data that water-repellency is only obtained by the use of the polyethylene and stearone together in amounts ranging from 12.5 to 87.5% of the stearone and from 87.5 to 12.5% of the oxidized polyethylene.

EXAMPLES 62 TO 70

A series of textile padding baths was prepared, employing 10% of the emulsion of Example 1, 3% of Resloom M-75 (a thermosetting melamine-formaldehyde resin), and the various acidic catalysts in the amounts shown in Table XII. The pH of the padding baths is given in the table.

*Table XII*

| Example No. | Acidic catalyst | Bath pH |
|---|---|---|
| 62 | 0.3% $ArOCl_2 \cdot 8H_2O$ | 3.9 |
| 63 | 0.5% $ZrOCl_2 \cdot 8H_2O$ | 4.0 |
| 64 | 1.0% Zr Acetate Sol+0.2% $NH_4Cl$ | 5.2 |
| 65 | 2.0% $(NH_4)_3ZrOH(CO_3)_3$ Sol+0.2% $NH_4Cl$ | 7.0 |
| 66 | 1.0% $MgCl_2 \cdot 6H_2O$ | 7.3 |
| 67 | 1.0% $(NH_4)_2SO_4$ | 7.1 |
| 68 | 1.0% $(NH_4)_2HPO_4$ | 7.6 |
| 69 | 3.0% $H_2ZrO_2(C_2H_3O_2)_2$ Sol | 4.3 |
| 70 | 0.2% $NH_4Cl$ | 6.7 |

These baths were then applied to spun Orlon, Dacron filament, acetate taffeta, nylon twill, nylon satin, Dacron-cotton, worsted flannel, woolen worsted flannel and viscose acetate fabrics, in accordance with the procedure of Example 1. The water-repellency data obtained on these fabrics using the A.A.T.C.C. Standard Test Method 22-1952 is given in Table XIII. The water-repellency was determined initially and after five washings on "synthetic" setting in an Easy automatic washer, and after three dry cleanings with Stoddard solvent and with perchlorethylene.

*Table XIII*

| Example No. | Spun Orlon | | | | Dacron Filament | | | | Acetate Taffeta | | | |
|---|---|---|---|---|---|---|---|---|---|---|---|---|
| | Initial | 5 Wash. | 3 Stoddard solvent | 3 Perchlorethylene | Initial | 5 Wash. | 3 Stoddard solvent | 3 Perchlorethylene | Initial | 5 Wash. | 3 Stoddard solvent | 3 Perchlorethylene |
| 62 | 100 | 75 | 100 | 75 | 100 | 90 | 90 | 85 | 100 | 85 | 100 | 90 |
| 63 | 100 | 80 | 90 | 70 | 90 | 85 | 85 | 70 | 100 | 85 | 90 | 85 |
| 64 | 100 | 100 | 100 | 75 | 100 | 85 | 85 | 75 | 100 | 85 | 100 | 85 |
| 65 | 100 | 100 | 90 | 75 | 85 | 85 | 90 | 85 | 100 | 85 | 100 | 85 |
| 66 | 100 | 80 | 90 | 80 | 100 | 85 | 90 | 85 | 100 | 85 | 100 | 90 |
| 67 | 100 | 75 | 100 | 85 | 100 | 85 | 100 | 90 | 100 | 85 | 100 | 85 |
| 68 | 100 | 80 | 100 | 85 | 100 | 90 | 90 | 90 | 100 | 85 | 90 | 85 |
| 69 | 100 | 90 | 100 | 90 | 100 | 90 | 85 | 85 | 100 | 85 | 85 | 85 |
| 70 | 100 | 80 | 100 | 70 | 90 | 85 | 90 | 80 | 100 | 85 | 100 | 85 |

| Example No. | Nylon Twill | | | | Nylon Satin | | | | Dacron-Cotton | | | |
|---|---|---|---|---|---|---|---|---|---|---|---|---|
| | Initial | 5 Wash. | 3 Stoddard solvent | 3 Perchlorethylene | Initial | 5 Wash. | 3 Stoddard solvent | 3 Perchlorethylene | Initial | 5 Wash. | 3 Stoddard solvent | 3 Perchlorethylene |
| 62 | 100 | 85 | 100 | 90 | 100 | 90 | 100 | 90 | 100 | 75 | 100 | 85 |
| 63 | 100 | 85 | 100 | 80 | 100 | 85 | 90 | 85 | 100 | 75 | 100 | 100 |
| 64 | 100 | 85 | 90 | 80 | 100 | 85 | 100 | 85 | 100 | 90 | 100 | 100 |
| 65 | 100 | 85 | 85 | 80 | 100 | 85 | 100 | 85 | 100 | 100 | 100 | 75 |
| 66 | 100 | 85 | 100 | 90 | 100 | 85 | 100 | 85 | 100 | 75 | 80 | 75 |
| 67 | 100 | 85 | 100 | 85 | 100 | 85 | 100 | 85 | 100 | 80 | 90 | 75 |
| 68 | 100 | 85 | 100 | 80 | 100 | 85 | 100 | 85 | 100 | 75 | 90 | 100 |
| 69 | 100 | 90 | 100 | 85 | 100 | 85 | 85 | 85 | 100 | 100 | 100 | 90 |
| 70 | 100 | 85 | 90 | 90 | 100 | 85 | 100 | 85 | 100 | 80 | 100 | 70 |

Table XIII—(continued)

| Example No. | Worsted Flannel | | | | Woolen-Worsted Flannel | | | | Viscose-Acetate | | | |
|---|---|---|---|---|---|---|---|---|---|---|---|---|
| | Initial | 5 Wash. | 3 Stoddard solvent | 3 Perchlor-ethylene | Initial | 5 Wash. | 3 Stoddard solvent | 3 Perchlor-ethylene | Initial | 5 Wash. | 3 Stoddard solvent | 3 Perchlor-ethylene |
| 62 | 100 | 90 | 100 | 90 | 100 | 90 | 100 | 90 | 100 | 70 | 100 | 100 |
| 63 | 100 | 80 | 100 | 80 | 100 | 80 | 100 | 80 | 100 | 75 | 100 | 90 |
| 64 | 100 | 75 | 100 | 100 | 100 | 80 | 100 | 80 | 100 | 75 | 100 | 100 |
| 65 | 100 | 75 | 90 | 90 | 90 | 80 | 80 | 85 | 100 | 75 | 100 | 100 |
| 66 | 90 | 80 | 80 | 80 | 85 | 90 | 90 | 90 | 100 | 75 | 100 | 100 |
| 67 | 100 | 80 | 90 | 70 | 85 | 90 | 80 | 80 | 100 | 75 | 100 | 100 |
| 68 | 100 | 80 | 90 | 80 | 90 | 100 | 80 | 90 | 100 | 70 | 100 | 85 |
| 69 | 80 | 90 | 80 | 80 | 75 | 80 | 90 | 80 | 100 | 100 | 100 | 100 |
| 70 | 100 | 75 | 90 | 80 | 90 | 85 | 80 | 85 | 100 | 75 | 100 | 100 |

It is apparent that effective and durable water-repellency resistant both to laundering and to dry cleaning is obtained with all of these application media.

EXAMPLES 71 TO 75

A series of padding baths were prepared using a variety of polymeric waxes. The basic formulation was 50 parts of stearone and 50 parts of polymeric wax, 12.5 parts Tergitol NP-27, and 2.5 parts Tergitol NP-40, blended together as a hot-melt at 110° C. maximum, to which was added 5 parts triethanolamine, and the mixture was heated five minutes at 98 to 100° C. Water was added to the molten blend over a period of thirty-five minutes at the same temperature. The emulsion which was obtained was cooled quickly to 25° C.

10% by weight of each emulsion was added to 3% methylated methylol melamine resin and 0.3% zirconium oxychloride $ZrOCl_2 \cdot 8H_2O$. The resulting padding bath was applied to three cotton fabrics, white cotton 80 x 80 sheeting, blue cotton poplin, and khaki sateen. The wet pickup of the padding emulsion ranged from 70% for the 80 x 80 cotton to 65% for the sateen. After padding, the samples were dried five minutes at 250° F. and cured five minutes at 320° F. The treated fabrics were conditioned four hours under standard conditions (70° F. and 65% relative humidity).

Water-repellency was determined by the initial spray rating according to Federal Specification CCC-T-191b, Method 5526. Some of the samples were given one laundering with soap in an automatic washer, and others were dry cleaned in Stoddard Solvent following Federal Specification CCC-T-191b, Method 5508. After conditioning the laundered and dry cleaned samples, the water-repellency was determined by the same method. The results are given in Table XIV below.

wood furniture. It gave a durable water-repellent finish to the furniture.

This composition can also be used to polish wood floors, with the same result. A high polish is obtainable by buffing the finish.

EXAMPLES 77 TO 81

A series of paper coating baths were prepared using as the basic formulation 50 parts stearone, 50 parts of polymeric wax, 12.5 parts Tergitol NP-27, and 2.5 parts Tergitol NP-40, all blended together as a hot melt at 110° C. 5 parts triethanolamine was added to this, and the mixture heated five minutes at 100° C., after which water was added to form an emulsion which was cooled quickly to 25° C.

10% by weight of each emulsion was added to 3% methylated methylol melamine resin and 0.3% zirconium oxychloride $ZrOCl_2 \cdot 8H_2O$. This bath was then applied to paper, using a pair of kissing rolls, and the paper was dried for five minutes at 100° F. and cured for an hour at 200° F.

The polymeric waxes employed were as follows:

Table XV

| Example No. | Emulsion applied with resin plus catalyst |
|---|---|
| 77 | Stearone—oxidized polyethylene (AC-629). |
| 78 | Stearone—Fischer-Tropsch wax (Acid No. 5 to 9). |
| 79 | Stearone—oxidized microcrystalline wax. |
| 80 | Stearone—high density emulsifiable oxidized polyethylene (Epolene HDE, molecular weight 1500). |
| 81 | Stearone—low viscosity emulsifiable oxidized polyethylene (Epolene LVE, molecular weight 1500). |

The papers had an excellent water-repellency.

Table XIV

| Example No. | Emulsion applied with resin plus catalyst | 80 x 80 Cotton | | | Blue Poplin | | | Khaki Sateen | | |
|---|---|---|---|---|---|---|---|---|---|---|
| | | Initial | Laundered | Dry cleaned | Initial | Washed | Dry cleaned | Initial | Washed | Dry cleaned |
| 71 | Stearone—oxidized polyethylene (AC-629). | 100 | 100 | 80 | 100 | 90 | 90 | 100 | 70+ | 70+ |
| 72 | Stearone—Fischer-Tropsch wax (Acid No. 5 to 9). | 100 | 100 | 70 | 100 | 70 | 70 | 100 | 70 | 70 |
| 73 | Stearone—oxidized microcrystalline wax. | 100 | 90 | 70 | 100 | 80 | 70 | 100 | 70 | 80 |
| 74 | Stearone—high density emulsifiable oxidized polyethylene (Epolene HDE, molecular weight 1500). | 100 | 100 | 70 | 100 | 90 | 70 | 100 | 70+ | 80 |
| 75 | Stearone—low viscosity emulsifiable oxidized polyethylene (Epolene LVE, molecular weight 1500). | 100 | 100 | 80+ | 100 | 90 | 80 | 100 | 70+ | 80 |

It is apparent that all of these polymeric waxes are effective in combination with stearone to produce a durable water-repellent finish on these fabrics.

EXAMPLE 76

A 2% solvent solution of 50 parts polyethylene (AC-629) and 50 parts of stearone in 5000 parts of tetrachloroethylene was prepared, and this solution was applied to

EXAMPLES 82 TO 91

A series of textile padding baths were prepared employing 10% of the emulsion of Example 1, 3% Resloom M-75 (a thermosetting melamine-formaldehyde resin) and the acidic catalysts noted in Table XVI. These baths were applied to 80 x 80 cotton sheeting, 5 ounce cotton poplin, and 9 ounce cotton sateen fabrics, in accordance with the procedure of Example 1. The curing temperatures and times are given in Table XVI. The water-repellency data was obtained using the A.A.T.C.C. Standard Test Method 22-1952. Readings were taken initially and after five washings on "synthetic" setting in an Easy automatic washer, and after three dry cleanings with Stoddard Solvent and with perchlorethylene.

ten minutes at 250° F. For dry cleaning purposes, seven treated samples plus seven dummy samples at each set were dry cleaned, and air dried for one hour and oven-dried for one hour at 160° F. and five minutes at 250° F., using both Stoddard Solvent and perchlorethylene.

The following table summarizes the compositions of

Table XVI

| Ex. No. | Catalyst | Curing 5 minutes, temperature, °F. | 80 x 80 Sheeting | | | | 5 Ounce Poplin | | | | 9 Ounce Sateen | | | |
|---|---|---|---|---|---|---|---|---|---|---|---|---|---|---|
| | | | Initial | 5 Wash. | 3 Stoddard Solvent | 3 Perchlor-ethylene | Initial | 5 Wash. | 3 Stoddard Solvent | 3 Perchlor-ethylene | Initial | 5 Wash. | 3 Stoddard Solvent | 3 Perchlor-ethylene |
| 82 | None | 250 | 100 | 50 | 70 | 50 | 100 | 50 | 70 | 50 | 100 | 50 | 50 | 50 |
| 83 | ___do___ | 320 | 100 | 80 | 80 | 70 | 100 | 80 | 80 | 70 | 100 | 80 | 70 | 70 |
| 84 | 2% CaCl$_2$ | 320 | 100 | 80 | 70 | 80 | 100 | 70 | 80 | 70 | 100 | 70 | 80 | 70 |
| 85 | 2% Zn(BF$_4$)$_2$-40% | 320 | 100 | 70 | 80 | 80 | 100 | 70 | 70 | 70 | 100 | 80 | 70 | 70 |
| 86 | 1% Zn(NO$_3$)$_2$·6H$_2$O | 320 | 100 | 70 | 80 | 80 | 100 | 70 | 80 | 80 | 100 | 70 | 80 | 80 |
| 87 | 2% (NH$_4$)$_2$HPO$_4$ | 320 | 100 | 90 | 70 | 70 | 100 | 80 | 70 | 70 | 100 | 80 | 70 | 70 |
| 88 | 1% (NH$_4$)$_2$SO$_4$ | 320 | 100 | 100 | 100 | 80 | 100 | 100 | 100 | 70 | 100 | 80 | 70 | 70 |
| 89 | 0.5% ZrOCl$_2$·8H$_2$O | 250 | 100 | 80 | 100 | 100 | 100 | 80 | 100 | 100 | 100 | 90 | 100 | 80 |
| 90 | 4.0% (NH$_4$)$_3$ZrOH(CO$_3$)$_3$ sol. | 320 | 100 | 100 | 100 | 70 | 100 | 100 | 100 | 70 | 100 | 70 | 90 | 80 |
| 91 | 1.0% H$_2$ZrO$_2$(C$_2$H$_3$O$_2$)$_2$ sol. | 320 | 100 | 90 | 100 | 90 | 100 | 80 | 100 | 90 | 100 | 70 | 100 | 80 |

It is apparent that effective and durable water-repellency resistant both to laundering and to dry cleaning is obtained when finishes are cured with any of these catalysts. The calcium and zirconium salts are acidic catalysts, and the ammonium salts are latent acid catalysts, developing their acidity only during the curing.

EXAMPLES 92 TO 97

A group of padding baths was prepared, incorporating a fluorocarbon recommended for imparting oil-repellency to fabrics as well as the water-repellent composition of the invention, so as to obtain both oil- and water-repellency. The water-repellent composition employed was a hot melt blend prepared in accordance with Examples 71 to 75. Three basic formulations were prepared containing 10%, 7%, and 5%, respectively, of this emulsion, to which was added 5% methylated methylol melamine resin, and 0.5% ZrOCl$_2$·8H$_2$O. To these basic water-repellent formulations in accordance with the invention was added 3% or 5% of a polyperfluoroacrylate resin having the general formula:

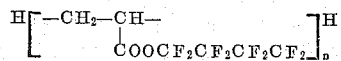

The resulting padding baths were applied to 80 x 80 cotton sheeting. The weight pickup of the emulsion was about 70%. After padding, the fabrics were dried for five minutes at 250° F., and cured for five minutes at 320° F.

Water-repellency was determined in accordance with the A.A.T.T.C. Standard Test, and oil-repellency in accordance with the following test. Seven treated samples plus thirteen dummy samples were then given one wash in a solution containing 20 g. of Ivory flakes plus one wash with only water in an Easy washer using the settings "normal fabrics," "small load," "hot wash temperature," "warm rinse temperature." The temperature of the washes was 66° and 72° C. The samples were dried for the padding solutions, and the spray ratings before and after laundering and dry cleaning.

Table XVII

| Example No. | Amount of lene-stearone emulsion, percent | Amount of methylol melamine resin, percent | Amount of Catalyst (ZrOCl$_2$), percent | Amount of fluoro-acrylate resin, percent | pH | Spray Ratings | | | | Oil Repellency | | | |
|---|---|---|---|---|---|---|---|---|---|---|---|---|---|
| | | | | | | Initial | Laundering | Stoddard solvent | Perchlor-ethylene | Initial | Laundering | Stoddard solvent | Perchlor-ethylene |
| 92 | 10 | 5 | 0.5 | | 3.80 | 100 | 90 | 80 | 70 | 0 | 0 | 0 | 0 |
| 93 | 7 | 5 | 0.5 | 3 | 3.60 | 100 | 80 | 80 | 70 | 90 | 70 | 100 | 100 |
| 94 | 5 | 5 | 0.5 | 5 | 3.10 | 80+ | 70 | 80 | 70 | 90 | 70 | 100 | 90 |
| 95 | | | | 5 | 6.70 | 80 | 50 | 80 | 70 | 70 | 0 | 70 | 80 |
| 96 | 7 | 5 | 0.5 | 5 | 3.42 | 100 | 80+ | 80+ | 70+ | 100 | 90 | 100 | 100 |
| 97 | 5 | 5 | 0.5 | 5 | 3.10 | 90 | 80 | 80 | 70+ | 100 | 90 | 100 | 90 |

It is apparent that both durable water-repellency and durable oil-repellency are obtained using the combination of the water-repellent of the invention and a polyperfluoroacrylate resin.

EXAMPLES 98 TO 103

A series of padding baths was prepared employing the polymeric wax-stearone blends of Examples 71 to 75. To these baths were added the amount of cross-linking agents and catalysts noted in Table VIII. 10% of polymeric wax-stearone emulsion was used in each case. One-half of the total amount of water added was added to the polymeric wax-stearone blend to form the emulsion, and the cross-linking agent was added to the remainder of the water, to which was then added the wax emulsion and the catalyst. The solutions were applied on a padder at No. 4 setting to blue poplin, dried for five minutes at 250° F., and cured for five minutes at 320° F.

Water-repellency was determined after laundering in the Easy washer and after dry cleaning with Stoddard Solvent. The laundering test was carried out by washing seven treated samples plus twelve dummy samples in six consecutive washes in the Easy automatic washer, the first five using 20 g. of Ivory flakes, and the sixth with only water. The settings used were "Normal Fabrics," "Small Load," "Hot Wash Temperature," "Warm Rinse Temperature." The temperatures of the washings were 60° C. and 58° C.

In the dry cleaning, seven treated samples plus eight dummy samples were dry cleaned, air dried for one hour and oven dried for one hour at 160° F., and for five minutes at 250° F. The results obtained are given in Table XVIII.

Table XVIII

| Example No. | Amount of polymeric wax-stearone emulsion, percent | Cross-linking agent amount | Catalyst amount | pH | Spray ratings | | |
|---|---|---|---|---|---|---|---|
| | | | | | Initial | Laundering | Stoddard solvent |
| 98 | 10 | | 0.4% zinc fluoborate | 7.81 | 80 | 50+ | 70+ |
| 99 | 10 | 4.2% tris (aziridinyl) phosphine oxide | 0.5% ZrOCl₂·8H₂O | 5.29 | 100 | 80+ | 80 |
| 100 | 10 | 5% spiroformal of pentaerythritol | 0.5% ZrOCl₂·8H₂O | 2.40 | 100 | 90 | 80+ |
| 101 | 10 | 5% polyformal of triethylene glycol | 0.5% ZrOCl₂·8H₂O | 2.70 | 100 | 90 | 70 |
| 102 | 10 | 5% glutaraldehyde | 0.5% ZrOCl₂·8H₂O | 2.31 | 100 | 70 | 80 |
| 103 | 10 | 3% dialdehyde starch | 0.5% ZrOCl₂·8H₂O | 2.40 | 90 | 70 | 80 |

It is apparent that durable water-repellency is obtainable using each of these cross-linking agents in combination with the polymeric wax-stearone formulation.

We claim:

1. A water-repellent composition for imparting water-repellency to fibrous materials consisting essentially of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone.

2. A water-repellent composition for imparting water-repellency to fibrous materials consisting essentially of a hot-melt blend of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone.

3. A water-repellent composition for imparting water-repellency to fibrous materials consisting essentially of an emulsion in water of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone.

4. A water-repellent composition from imparting water-repellency to fibrous materials consisting essentially of a solution in an organic solvent of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone.

5. A water-repellent composition for imparting water-repellency to fibrous materials consisting essentially of an oxidized polymeric wax having a molecular weight above about 750, a fatty ketone having from about eighteen to about sixty carbon atoms, in the proportion of from 12.5 to 87.5 parts of the wax to from 87.5 to 12.5 parts of the ketone, and a polymerizable cross-linking agent selected from the group consisting of aldehyde compounds and resins, acetals, polyamines, epoxy-containing compounds, and phosphine and phosphonium compounds in an amount to improve the durability of the water-repellency imparted to the fibrous material by the composition.

6. A water-repellent emulsion for imparting water-repellency to fibrous materials consisting essentially of an oxidized polymeric wax having a molecular weight above about 750, a fatty ketone having from about eighteen to about sixty carbon atoms, in the proportion of from 12.5 to 87.5 parts of the wax to from 87.5 to 12.5 parts of the ketone, and a polymerizable cross-linking agent selected from the group consisting of aldehyde compounds and resins, acetals, polyamines, epoxy-containing compounds, and phosphine and phosphonium compounds in an amount to improve the durability of the water-repellency imparted to the fibrous material by the composition, the said ingredients being dispersed in water.

7. A water-repellent fibrous material having a water-repellent finish resistant to removal by laundering and dry cleaning, consisting essentially of an oxidized polymeric wax having a molecular weight above about 750, a fatty ketone having from about eighteen to about sixty carbon atoms, in the proportion of from 12.5 to 87.5 parts of the wax to from 87.5 to 12.5 parts of the ketone, and an in situ polymerized cross-linking agent selected from the group consisting of aldehyde compounds and resins, acetals, polyamines, epoxy-containing compounds, and phosphine and phosphonium compounds in an amount to improve the durability of the water-repellent finish.

8. A process for imparting to fibrous materials a water-repellency that is resistant to removal by laundering and dry cleaning, which comprises applying thereto an application medium consisting essentially of an oxidized polymeric wax having a molecular weight above about 750, a fatty ketone having from about eighteen to about sixty carbon atoms, in the proportion of from 12.5 to 87.5 parts of the wax to from 87.5 to 12.5 parts of the ketone, and a polymerizable cross-linking agent selected from the group consisting of aldehyde compounds and resins, acetals, polyamines, epoxy-containing compounds, and phosphine and phosphonium compounds, in an amount within the range of from about 1 to about 200% by weight based on the total weight of the wax and the ketone to improve the durability of the water-repellency, and heating the resulting material at a temperature at which polymerization of the cross-linking agent is advanced to form a durable water-repellent finish on the fibrous material.

9. A process for imparting to fibrous materials a water- and oil-repellency that is resistant to removal by laundering and dry cleaning, which comprises applying to the material an application medium consisting essentially of an oxidized polymeric wax having a molecular weight above about 750, a fatty ketone having from about eighteen to about sixty carbon atoms, in the proportion of from 12.5 to 87.5 parts of the wax to from 87.5 to 12.5 parts of the ketone, a fluorine-containing oil-repellent, and a polymerizable cross-linking agent selected from the group consisting of aldehyde compounds and resins, acetals, polyamines, epoxy-containing compounds, and phosphine and phosphonium compounds, in an amount within the range of from about 1 to about 200% by weight based on the total weight of the wax and the ketone to improve the durability of the water- and oil-repellency, and heating the resulting material at a temperature at which polymerization of the cross-linking agent is advanced to form a durable water- and oil-repellent finish on the fibrous material.

10. A water- and oil-repellent fibrous material having a water- and oil-repellent finish resistant to removal by laundering and dry cleaning, consisting essentially of an oxidized polymeric wax having a molecular weight above about 750, a fatty ketone having from about eighteen to about sixty carbon atoms, in the proportion of from 12.5 to 87.5 parts of the wax to from 87.5 to 12.5 parts of the ketone, a fluorine-containing oil-repellent, and an in situ polymerized cross-linking agent selected from the group consisting of aldehyde compounds and resins, acetals, polyamines, epoxy-containing compounds, and phosphine and phosphonium compounds in an amount within the range of from about 1 to about 200% by weight based on the total weight of the wax and the ketone to improve the durability of the oil- and water-repellent finish.

11. A water-repellent composition in accordance with claim 5 in which the cross-linking agent is an aldehyde.

12. A water-repellent composition in accordance with claim 5 in which the cross-linking agent is a methylol melamine.

13. A water-repellent composition in accordance with claim 5 in which the cross-linking agent is dimethylol urea.

14. A water-repellent composition in accordance with claim 5 in which the cross-linking agent is a melamine-formaldehyde resin.

15. A water-repellent composition in accordance with claim 5 in which the cross-linking agent is a water-dispersible thermosetting aldehyde resin.

16. A water-repellent composition in accordance with claim 5 in which the cross-linking agent is an epoxy resin.

17. A water-repellent fibrous material having a water-repellent finish resistant to removal by laundering and dry cleaning, consisting essentially of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone.

18. A water-and oil-repellent composition for imparting both water and oil repellency to fibrous materials, consisting essentially of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone, and a fluorine-containing oil-repellent selected from the group consisting of fluorocarbon Werner complexes and polyperfluoroacrylates.

19. A water- and oil-repellent composition in accordance with claim 18, in which the fluorine-containing oil repellent is a fluorocarbon Werner complex.

20. A water- and oil-repellent composition in accordance with claim 18, in which the fluorine-containing oil repellent is a polyperfluoroacrylate.

21. A water- and oil-repellent fibrous material having a water- and oil-repellent finish resistant to removal by laundering and dry cleaning, consisting essentially of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone, and a fluorine-containing oil-repellent selected from the group consisting of fluorocarbon Werner complexes and polyperfluoroacrylates.

22. A process for imparting to fibrous materials a water- and oil-repellency that is resistant to removal by laundering and dry cleaning, which comprises applying to the material an application medium consisting essentially of an oxidized polymeric wax having a molecular weight above about 750 and an acid number of at least 2, and a fatty ketone having from about eighteen to about sixty carbon atoms, in the proportion of from 12.5 to 87.5 parts of the wax to from 87.5 to 12.5 parts of the ketone, and a fluorine-containing oil-repellent selected from the group consisting of fluorocarbon Werner complexes and polyperfluoroacrylates, and forming a water- and oil-repellent finish thereon of said composition.

References Cited by the Examiner

UNITED STATES PATENTS

| | | | |
|---|---|---|---|
| 2,033,544 | 3/36 | Ralston | 252–311.5 |
| 2,039,837 | 5/36 | Ralston et al. | 106—270 |
| 2,566,272 | 8/51 | Werntz | 117–168 |
| 2,755,193 | 7/56 | Rumberger | 106–270 |
| 2,858,236 | 10/58 | Asselin et al. | 106–270 |

FOREIGN PATENTS 533,856   11/56   Canada.

OTHER REFERENCES

Bennett: Commercial Waxes, Chemical Publishing Co., Inc., N.Y., 2nd edition, 1956, pages 174–176.

Warth, A. H.: "The Chemistry and Technology of Waxes," page 855, 2nd edition, Reinhold Publishing Corporation, New York, 1956.

MORRIS LIEBMAN, *Primary Examiner.*

JOSEPH REBOLD, ALEXANDER H. BRODMERKEL,
*Examiners.*